(12) United States Patent
Fomenko et al.

(10) Patent No.: US 11,605,942 B2
(45) Date of Patent: Mar. 14, 2023

(54) ELECTRICAL CIRCUIT BREAKER SYSTEM WITH TEMPERATURE-DEPENDENT TOTAL CURRENT MONITORING

(71) Applicant: Phoenix Contact GmbH & Co. KG, Blomberg (DE)

(72) Inventors: Alexander Fomenko, Bielefeld (DE); Vjaceslav Magazinik, Detmold (DE); Gerhard Wölk, Schieder-Schwalenberg (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 0 days.

(21) Appl. No.: 17/153,717

(22) Filed: Jan. 20, 2021

(65) Prior Publication Data
US 2021/0226438 A1 Jul. 22, 2021

(30) Foreign Application Priority Data
Jan. 20, 2020 (DE) .......................... 102020101193.8

(51) Int. Cl.
*H02H 7/22* (2006.01)
*H02H 3/08* (2006.01)
*H01H 71/14* (2006.01)

(52) U.S. Cl.
CPC ............ *H02H 3/085* (2013.01); *H01H 71/14* (2013.01); *H02H 7/222* (2013.01)

(58) Field of Classification Search
CPC .......... H01H 71/14; H01H 71/22; H02H 3/08; H02H 3/006; H02H 3/033; H02H 3/085; H02H 7/222; H02H 5/041
See application file for complete search history.

(56) References Cited

U.S. PATENT DOCUMENTS

| 2004/0101312 A1* | 5/2004 | Cabrera ............. H04B 10/1149 398/172 |
| 2014/0078633 A1* | 3/2014 | Zhou .................... H01H 71/123 361/115 |
| 2017/0025845 A1* | 1/2017 | Platise ................. H02H 3/085 |

FOREIGN PATENT DOCUMENTS

| DE | 102004021998 A1 | 5/2006 |
| DE | 102008026737 A1 | 4/2009 |
| DE | 102014004912 A1 | 10/2015 |

(Continued)

*Primary Examiner* — Bryan R Perez
(74) *Attorney, Agent, or Firm* — Weber Rosselli & Cannon LLP (57) ABSTRACT

An electrical circuit breaker system including an input terminal connecting an electrical current source and a plurality of output terminals for connecting electrical loads. Each output terminal includes an electrical switch and a current measuring unit. The circuit breaker system includes a current acquiring unit for acquiring current magnitudes measured at the output terminals and for determining a total current magnitude. A temperature acquiring unit acquires a temperature, and a computing unit is configured to determine a total current limit as a function of the acquired temperature. Further, a control unit is configured to select one of the plurality of output terminals based on a ranking of the output terminals and to interrupt the current supply at the selected output terminal by means of the corresponding electrical switch when the total current magnitude exceeds the determined total current limit.

20 Claims, 5 Drawing Sheets

(56) References Cited

FOREIGN PATENT DOCUMENTS

| DE | 102014214840 A1 | 2/2016 |
|---|---|---|
| DE | 102015102441 A1 | 8/2016 |

* cited by examiner

ELECTRICAL CIRCUIT BREAKER SYSTEM WITH TEMPERATURE-DEPENDENT TOTAL CURRENT MONITORING

FIELD

The disclosure relates to an electrical circuit breaker system with temperature-dependent total current monitoring.

BACKGROUND

In the prior art, circuit breakers are known for disconnecting and protecting DC power systems. These circuit breakers may, for example, be clamped directly onto conductor rails and feed a load to be protected via an electrical switch, for which semiconductor switches in particular, preferably metal-oxide semiconductor field-effect transistors (MOSFETs), have proved their worth.

However, the currents flowing through a circuit breaker during normal operation lead to power loss and corresponding self-heating of the circuit breaker, in particular the electrical switch.

In addition, there is a possible influence by the ambient temperature, i.e. the temperature in the immediate vicinity of the circuit breaker, which may be influenced, inter alia, by the distance to other devices. This is particularly relevant for circuit breaker systems in which a plurality of circuit breakers are operated side by side and thus each generate their own heat in the immediate vicinity of one another. These circuit breaker systems are usually modular, so that any number of circuit breakers may be arranged and operated next to each other on the conductor rails. The document DE 10 2012 001 615 B4 describes an arrangement of such modules in a row, in which the conductor rails are supplied with the supply voltage via a first row module as the head module.

This combination of self-heating and ambient temperature may lead to impermissibly high temperatures and thus to defects in the circuit breaker.

In order to avoid these impermissibly high temperatures, manufacturers usually specify limit parameters for the operation of the circuit breaker, such as a maximum continuous current, a maximum ambient temperature or a minimum distance to neighboring devices. However, this approach has significant disadvantages. For example, the circuit breaker must either be oversized for most applications in order to be designed for all possible scenarios, or a so-called current-temperature derating is required, i.e. the user must ensure that the circuit breaker is only used for applications with a lower load (for example, 6 A per channel) at higher temperatures or in direct series, and thus only fulfills the to maximum specifications (for example, 10 A per channel) to a limited extent. Thus, the user must always ensure himself that the specified limiting parameters are not exceeded during operation.

Moreover, in a circuit breaker system, there is not only one circuit to be monitored. Rather, an input current, for example with a maximum current magnitude (i.e., a maximum amperage) in the order of 40 A, is divided among the multitude of circuit breakers in order to be able to supply power to a corresponding multitude of loads. In this context, the number of circuit breakers operated side by side is of great importance, especially since the user can usually mount and operate any number of circuit breakers on the busbars (i.e., conductor rails) in a modular fashion.

SUMMARY

An object of the disclosure includes providing an electrical circuit breaker system in which the circuit breaker system is not subjected to continuous, harmful heating.

The object can be met by the features of the independent claim. Useful implementations and advantageous further developments of the disclosure are given in the dependent claims.

Embodiments of the disclosure are described below, partly with reference to the figures.

According to a first aspect, an electrical circuit breaker system is provided. The electrical circuit breaker system includes an input terminal configured to connect an electrical current source, and a plurality of output terminals each configured to connect electrical loads. Each output terminal includes an electrical switch for interrupting a current supply and a current measuring unit for measuring an individual current magnitude. Furthermore, the electrical circuit breaker system to includes a current acquiring unit, a temperature acquiring unit, a computing unit, and a control unit. The current acquiring unit is configured to acquire the individual current magnitudes measured at the plurality of output terminals and determine a total current magnitude corresponding to the sum of the individual current magnitudes. The temperature acquiring unit is configured to acquire a temperature. The computing unit is configured to determine a total current limit as a function of the sensed temperature. The control unit is configured to select one of the plurality of output terminals based on a ranking of the output terminals, and to interrupt the current supply at the selected output terminal by means of the corresponding electrical switch when the total current magnitude exceeds the determined total current limit.

The interrupting of the current supply may comprise interrupting the current supply through the respective output terminal. Measuring individual current magnitude may comprise measuring individual current magnitude through the respective output terminal.

The total current magnitude may correspond to the value of the current magnitude flowing at the input terminal of the electrical circuit breaker system. Optionally, the circuit breaker system may comprise another current measuring unit at the input terminal, which is configured to measure the total current magnitude directly at the input terminal.

The temperature-dependence of the total current limit may be implemented in various ways. A function of the total current limit depending on the acquired temperature may be stored in the computing unit. For example, the computing unit may calculate the total current limit using the function. Alternatively or complementarily, discrete total current limits may be stored or a step function may be stored as the function of the total current limit depending on the acquired temperature. The computing unit may be configured to determine one of the discrete total current limits when the sensed temperature reaches a predefined temperature or is within a temperature range associated with those discrete total current limits. Alternatively or additionally, the computing unit may be configured to track (preferably only) a temperature history of the acquired temperature. When a predefined temperature threshold is exceeded, an exceedance of the total current limit may be acquired (for example, independently of the acquired temperature). In other words, the total current limit may be zero at an acquired (e.g., sensed) temperature greater than or equal to the temperature threshold.

According to the ranking, the current supply may be interrupted at an output terminal, thereby disconnecting a load from the circuit, for example, so that the total current magnitude falls below the total current limit again. Thus, embodiments may ensure that the electrical circuit breaker system is protected from a persistent overload, and such overload may also take into account a temperature-dependence.

The output terminals may also be referred to as a channel.

The individual current magnitude may correspond to the value of the current magnitude measured by the current measuring unit at the respective output terminal.

In a modular design of the electrical circuit breaker system, a control module (also: head module) of the electrical circuit breaker system may comprise the input terminal and/or the control unit and/or the computing unit and/or the acquiring unit. Circuit breaker modules of the electrical circuit breaker system may each comprise at least one of the plurality of output terminals.

The control unit may be in signal connection with each switch, preferably for sending a control instruction (for example a telegram) for interrupting the current supply at the respective output terminal. Alternatively or additionally, the current acquiring unit may be in signal connection with each current acquiring unit, preferably for receiving the measured individual current magnitude. The signal connections may be realized via a signal bus, for example a serial bus, to which all switches and/or all current acquiring units are connected.

The computing unit may further be configured to determine an individual current limit (for example, for the individual current magnitude of one or each output terminal) as a function of the acquired temperature. The individual current limit may be implemented analogously to the total current limit in various ways, for example as mentioned previously for the total current limit. Preferably, a function of the individual current limit as a function of the acquired temperature may be stored in the computing unit (for example, for the individual current magnitude of one or each output terminal).

The control unit may further be configured to interrupt the current supply at one of the plurality of output terminals by means of the corresponding electrical switch when the individual current magnitude at that output terminal exceeds the individual current limit. For example, an individual current limit may be determined for each of the output terminals. The temperature on which the individual current limit depends may correspond to a temperature at the respective output terminal.

Thus, embodiments may monitor (i.e., perform or provide for monitoring) and/or protect (i.e., perform or provide for a protection) of the electrical circuit breaker system at two levels. On the one hand, the entire electrical circuit breaker system may be protected from overload, for example by monitoring and, if necessary, taking action (such as interrupting) when the current provided by the electrical current source exceeds a maximum current level, in this case the total current limit. Alternatively or in addition, each output terminal (also referred to as a channel) and/or the electrical switch of the respective output terminal may also be protected from overload. For this purpose, the corresponding output terminal may be monitored and, if necessary, interrupted if the current delivered to the respective loads exceeds a maximum current intensity, in this case the individual current limit.

The ranking of the output terminals (in short: ranking) may be determined in a variety of ways. The ranking may correspond to a predetermined prioritization of the plurality of output terminals, which, for example, may be chosen by the user of the electrical circuit breaker system. For example, the user may assign a priority to the respective output terminals to ensure that power continues to be supplied to the most important loads in the event of an overload. The predetermined prioritization may correspond to an arrangement (for example, linear or spatial) of the output terminals (or corresponding modules), for example, an arrangement along a mounting rail.

Herein, a decreasing order or an increasing order may correspond to a decreasing sorted order or an increasing sorted order.

Alternatively or additionally, the ranking may correspond to a (preferably decreasing) sequence of the acquired individual current magnitudes of the output terminals. This may mean that in the event of an overload, the output terminal with the highest individual current magnitude is disconnected (i.e., interrupted) first, i.e. the output terminal to which the load with the highest current consumption is connected. This may particularly ensure that the largest possible number of loads continue to be supplied with power.

Further alternatively or additionally, the ranking may correspond to an (for example increasing or decreasing) order of the distances of the output terminals between the control unit and/or the input terminal and the respective output terminal. In other words, the ranking may be determined by the distances of the output terminals relative to the control unit and/or the input terminal. In a modular design of the electrical circuit breaker system, the control module may be arranged (for example, mounted) at the beginning of a conductor rail (for example, in the direction of current), followed by the respective circuit breaker modules of the output terminals. According to the ranking, the output terminal furthest from the input terminal and/or the control unit may be disconnected from the current first, for example, the output terminal that was mounted last on the conductor rail. In this way, embodiments may prevent the risk of persistent overloading of the electrical circuit breaker system, for example if the user has mounted and commissioned an excessive number of output terminals on the conductor rails.

The temperature acquired by the temperature acquiring unit may correspond to different temperatures. In one embodiment, the temperature may correspond to a temperature of the control unit or the control module. This may be determined in the control unit or in the immediate vicinity of the control unit or in the control module or in the immediate vicinity of the control module. For this purpose, a temperature sensor may be integrated in the control unit or in the control module, which measures the corresponding temperature. Alternatively or additionally, the temperature acquiring unit may be configured to determine the temperature (preferably only) indirectly as a function of the total current magnitude acquired, for example based on the current heat law, which relates an increase in heating or a heat output (e.g., a heating power) to the square of the current magnitude.

Alternatively or additionally, the acquired temperature may correspond to an ambient temperature of the electrical circuit breaker system or comprise a corresponding ambient temperature value. This may, for example, be measured by means of a sensor outside the electrical circuit breaker system or by means of an external unit that transmits or forwards temperature information on the ambient temperature to the electrical circuit breaker system.

Alternatively or additionally, the acquired temperature may correspond to an average value and/or a maximum of the individual temperatures at each of the output terminals or may comprise the average value and/or the maximum. In this case, the temperature at each output terminal may be measured by a respective dedicated temperature sensor and the measured temperatures may be communicated to the controllability. Alternatively or additionally, when acquiring the mean value and/or the maximum, it is possible (for example, analogously to the temperature of the control unit or the control module) to determine the individual temperatures (preferably only) indirectly via the corresponding measured individual current magnitude, for example, in accordance with the current heat law.

The electrical switch may be a semiconductor switch, preferably a metal-oxide semiconductor field-effect transistor. Alternatively or complementarily, the switch may be another switch (that is, for example, commercially available or off the shelf).

The control unit may also be configured to issue a warning signal if the total current limit and/or the individual current limit is exceeded. The warning signal may preferably be an optical signal. The electrical circuit breaker system may comprise at least one warning signal unit configured to output (for example, display) a warning signal. The warning signal unit may be a display unit on which a warning is displayed, and/or a warning light that is activated to output the warning signal. It is also possible for the control unit to send a warning signal to an external device (for example, wired or wireless) to inform the user that the total current limit and/or the individual current limit has been exceeded. Furthermore, each output terminal may have a warning signal unit that is configured to individually output (for example, display) the exceeding of the individual current limit at the respective output terminal.

The control unit may further be configured to perform a check at periodic intervals to determine whether the total current limit and/or the individual current limit has been exceeded. Thus, embodiments may provide continuous or periodic monitoring of the load on the electrical circuit breaker system.

In the case of checking at periodic intervals, the control unit may further be configured to interrupt the current supply from one of the plurality of output terminals when the total current limit and/or the individual current limit is exceeded for a number of consecutive checks. The number may correspond to a predetermined threshold. The number of consecutive checks exceeding the total current may also be referred to as the total current count (or total current meter).

Alternatively or additionally, the control unit may further be configured to interrupt the current supply from any of the plurality of output terminals when the number of exceedances of the total current limit and/or the individual current limit minus the number of non-exceedances in past checks exceeds a predetermined threshold. When non-exceedances are included, the number of total current limit exceedance checks minus the number of non-exceedance checks may also be referred to as the total current count (or total current meter).

Further alternatively or in addition, the control unit may be further configured to increase an exceedance value by the value 1 each time the total current limit and/or the individual current limit is exceeded and to decrease the exceedance value by the value 1 each time the total current limit and/or the individual current limit is not exceeded, preferably with the exceedance value being greater than or equal to 0 (for example, by decreasing only when the exceedance value is positive). The control unit is configured to interrupt the current supply from (i.e., through or of) one of the plurality of output terminals when the exceedance value exceeds a predetermined threshold. In this case, the exceedance value may be referred to as the total current count (or total current meter).

Thus, embodiments may not, or need not to, perform an immediate interruption of the current supply of an output terminal when the total current limit and/or the individual current limit is exceeded in the case of periodic time interval verification, but only after this exceedance has been confirmed multiple times. This may ensure that it is actually a continuous overload (for example a continuous current exceedance) of the electrical circuit breaker system and not a short-term overload (for example a current surge), e.g. caused by short-term faults and/or a short-term temperature rise.

The predetermined threshold may be a first threshold if, based on the checks, the current supply is not interrupted (for example, currently or previously) from or at any of the plurality of output terminals. The predetermined threshold may be a second threshold if, as a result of exceeding the total current limit and/or the individual current limit (for example, currently or previously), the current supply from any of the plurality of output terminals is interrupted. The first threshold value may be greater than the second threshold value.

In an embodiment, if the current supply to or from an output terminal has already been interrupted, it is clear that this is a persistent overload that continues despite the interruption (for example, already having occurred) of a current supply. Accordingly, the current supply of another output terminal is interrupted after a shorter time interval, implemented by the second threshold value, which is smaller than the first threshold value.

In accordance with another aspect of the disclosure, the electrical circuit breaker system may be modular. The circuit breaker system may comprise at least two circuit breaker modules, each comprising at least one of the plurality of output terminals. The circuit breaker system may further comprise a control module comprising the current acquiring unit and/or the computing unit and/or the control unit and/or the input terminal. The temperature may comprise an ambient temperature measured in the control module.

Control module and circuit breaker modules may be collectively referred to as modules. Optionally, each circuit breaker module may be configured to tap current at or from the conductor rail.

The modules may be mounted or attachable to conductor rails (for example, as described at the beginning). The control module may be the first module in a series arrangement (e.g., a sequential arrangement) of the modules, for example a module located to the side of the series arrangement or an outermost module. The control module may comprise the input terminal or be located between the input terminal and the circuit breaker modules. Alternatively or in addition, the control module may be located (for example, in the direction of current flow) at the beginning of the conductor rail, and the respective circuit breaker modules (for example, corresponding to the direction of current flow or a negative gradient of current magnitude or direction of energy flow) behind the control module. This may allow the user to combine any number of circuit breaker modules for the circuit breaker system.

In one embodiment, the circuit breaker modules may each comprise one, preferably at least two, of the plurality of output terminals and a module current acquiring unit configured to acquire the individual current magnitude measured at the respective at least one output terminal and optionally configured to determine a total module current magnitude corresponding to the sum of the individual current magnitudes of the respective circuit breaker module. Optionally, the circuit breaker modules may each further comprise a module temperature acquiring unit for acquiring a temperature of the respective circuit breaker module and a module computing unit configured to determine a total module current limit as a function of the acquired module temperature. Further, the circuit breaker modules may each comprise a module control unit configured to select, based on the control unit, the one or one plurality of output terminals of the respective circuit breaker module, optionally based on a ranking or the ranking of the output terminals of the respective circuit breaker module, and to interrupt the current supply at the selected output terminal by means of the corresponding electrical switch when the total current magnitude exceeds the determined total current limit and/or the total module current magnitude exceeds the determined total module current limit.

In one variant embodiment, each of the circuit breaker modules may comprise at least two of the plurality of output terminals, a module current acquiring unit, a module temperature acquiring unit, a module computing unit, and/or a module control unit. The module current acquiring unit may be configured to acquire the individual current magnitudes measured at each of the at least two output terminals and determine a module total current magnitude corresponding to the sum of the individual current magnitudes of the respective circuit breaker module. The module temperature acquiring unit may be configured to acquire a temperature of the respective circuit breaker module. The module computing unit may be configured to determine a module total current limit as a function of the determined module temperature. The module control unit may be configured to select one of the plurality of output terminals of the respective circuit breaker module based on the ranking of the output terminals of the respective circuit breaker module, and to interrupt the current supply at the selected output terminal using the corresponding electrical switch when the total module current magnitude exceeds the total module current limit.

Thus, embodiments of the circuit breaker modules may autonomously decide whether an overload exists and the current supply to at least one of the output terminals must be interrupted.

In this embodiment, the control unit may monitor whether the total current magnitude exceeds the total current limit. If the total current limit is exceeded, the control unit selects one of the plurality of circuit breaker modules and instructs the module control unit of the selected circuit breaker module to interrupt the current supply to any or all of the output terminals of the selected circuit breaker module using the appropriate electrical switches.

The circuit breaker module may be selected based on a ranking of the circuit breaker modules, wherein the ranking of the circuit breaker modules may correspond to the ranking of the output terminals. Thus, the ranking of the circuit breaker modules may correspond to a predetermined prioritization of the plurality of the plurality of circuit breaker modules, to an order (for example, increasing or to decreasing) of the acquired total current magnitudes of the circuit breaker modules, and/or to an order (for example, increasing or decreasing) of the distances of the circuit breaker modules between the control unit and/or the input terminal and the respective circuit breaker module.

For example, the control unit may be in signal connection with each module control unit, preferably for sending a control instruction (for example, a telegram) for interrupting the current supply at the respective output terminal or respective circuit breaker modules. Alternatively or additionally, the current acquiring unit may be in signal connection with each module current acquiring unit, preferably for receiving the measured module total current magnitude. The signal connections may be implemented via the signal bus, for example the serial bus to which all circuit breaker modules may be connected.

The disclosure is explained in more detail below with reference to the accompanying figures based on embodiments of the disclosure.

DETAILED DESCRIPTION

Figure 1:
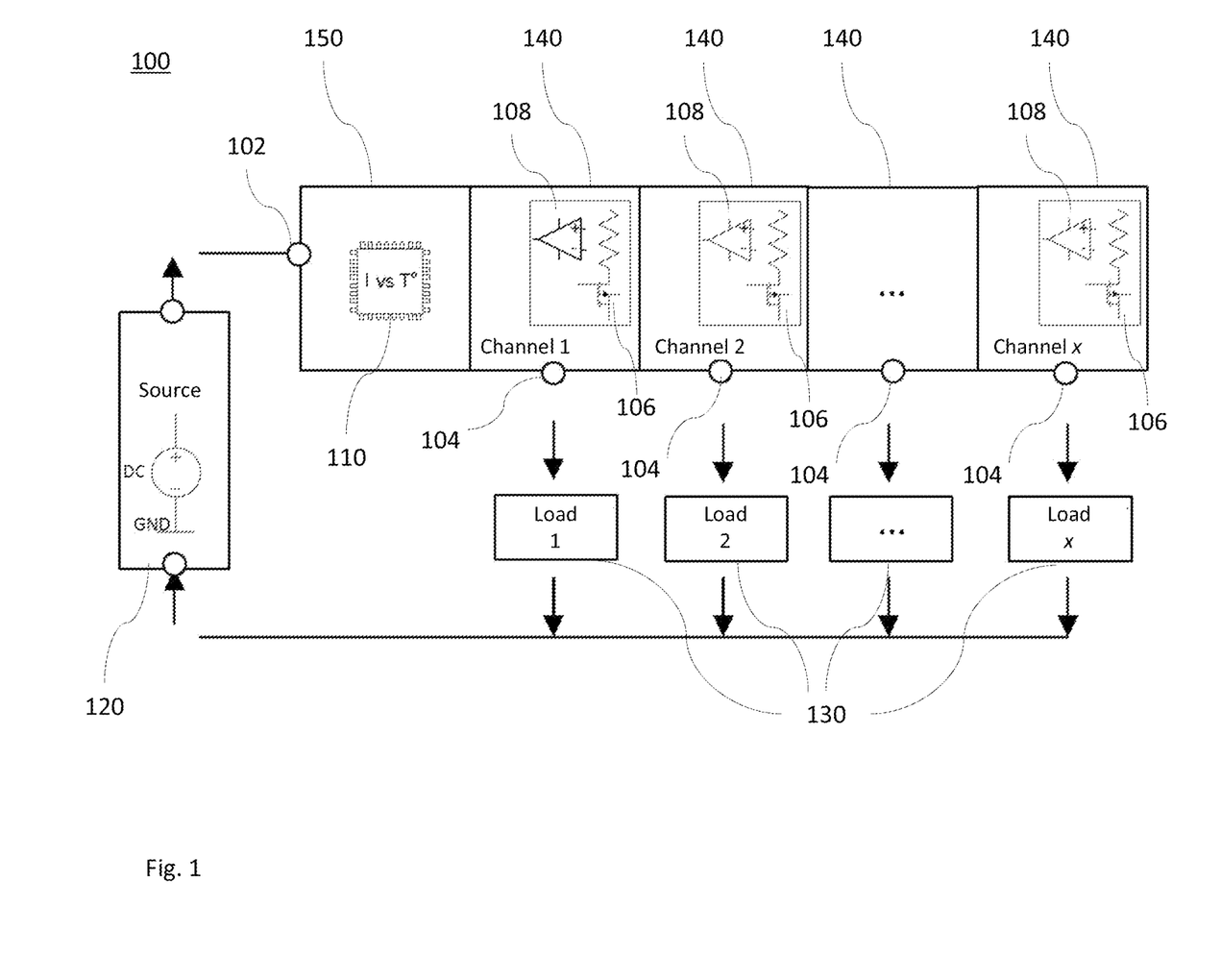
FIG. 1 a schematic representation of an electrical circuit breaker system according to a first embodiment.

FIG. 1 shows a schematic representation of an electrical circuit breaker system according to a first embodiment. The electrical circuit breaker system is herein generally designated by reference numeral 100.

The electrical circuit breaker system 100 includes an input terminal 102 and a plurality of output terminals 104, also referred to as channels, each output terminal 104 comprising an electrical switch 106 and a current measuring unit 108, and a control unit 110. In addition, the electrical circuit breaker system 100 is modular, comprising a plurality of circuit breaker modules 140, each comprising an output terminal 104, and a control module 150 comprising the control unit 110.

Figure 2:
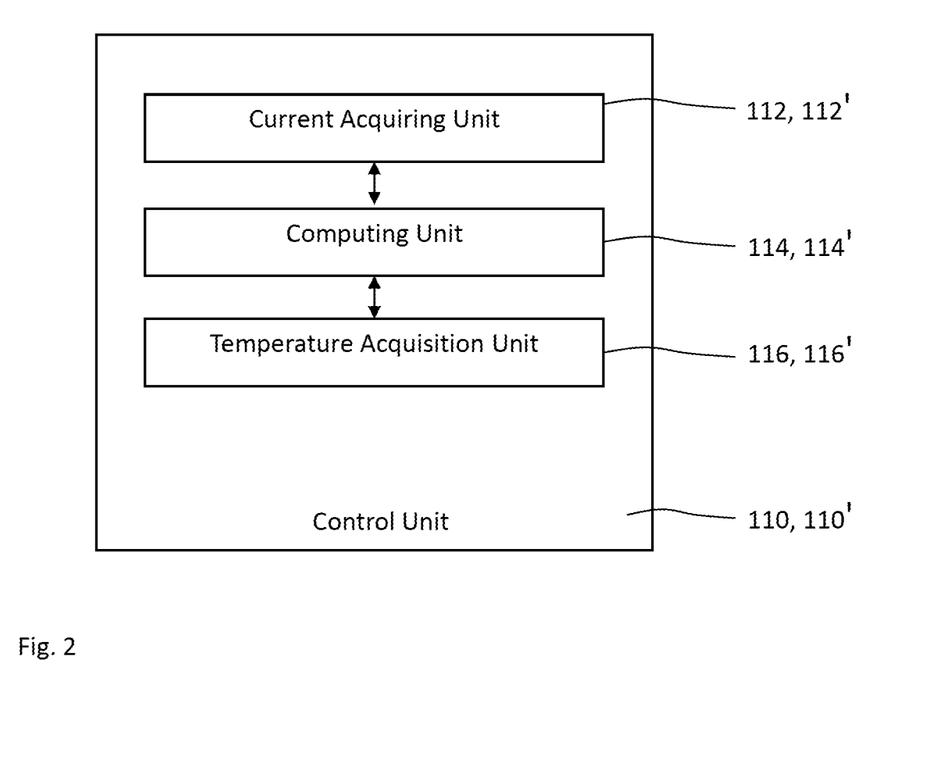
FIG. 2 a schematic representation of a control unit according to the first embodiment and a module control unit according to a second embodiment, respectively.

FIG. 2 shows a schematic representation of the control unit 110 according to the first embodiment. According to this, the control unit 110 includes a current acquiring unit 112, a temperature acquiring unit 116 and a computing unit 114.

Alternatively, each of the current acquiring unit 112, temperature acquiring unit 116, and computing unit 114, alone or in any combination with each other, may be a stand-alone unit or an independent unit.

Now, as shown in FIG. 1, if an electrical current source 120 is connected to the input terminal 102 and electrical loads 130 are connected to each of the plurality of output terminals 104, each of the connected loads 130 is supplied with power from the electrical current source 120. Thereby, the individual current magnitude flowing at each of the output terminals 104 is measured by the current measuring units 108, respectively. The current acquiring unit 112 acquires the measured individual current magnitudes and also determines a total current magnitude corresponding to the sum of the individual current magnitudes.

The temperature acquiring unit 116 acquires a temperature, which in this embodiment corresponds to the internal temperature of the control unit 110. Depending on the acquired temperature, the computing unit 114 determines a total current limit. Additionally, the computing unit 114 may also acquire an individual current limit as a function of the acquired (e.g., sensed) temperature.

If the control unit 110 determines that the total current magnitude exceeds the total current limit, the control unit 110 selects one of the plurality of output terminals 104 based on a ranking of the output terminals 104 and interrupts the current supply at the selected output terminal 104 using the corresponding electrical switch 106. Additionally, the control unit 110 may monitor the individual current magnitude, wherein the control unit 110 interrupts the current supply at one of the plurality of output terminals 104 using the corresponding electrical switch 106 if the individual current magnitude at that output terminal 104 exceeds the individual current limit.

There are various embodiments of computing unit 114 for determining the total current limit and/or individual current limit as a function of acquired temperature.

In one embodiment of the computing unit 114, the total current limit and/or the individual current limit depends linearly on the acquired temperature. For this purpose, the total current limit and/or the individual current limit him is determined according to $$I_{lim} = I_{max} \cdot (T_{u,max} - T_{u,ist}) / T_{u,max},$$

wherein $I_{max}$ is the maximum permissible current intensity at $T_{u,ist} = 0°$ C., for example an absolute total current limit and/or absolute individual current limit, wherein $T_{u,max}$ is the maximum permissible temperature, and $T_{u,ist}$ is the currently acquired temperature. For example, with a maximum permissible current of 45 A, a maximum permissible temperature of 90° C. and a currently acquired temperature of 60° C., this results in a total current limit and/or an individual current limit of $$I_{lim} = 45 \text{ A} \cdot (90° \text{ C.} - 60° \text{ C.}) / 90° \text{ C.} = 15 \text{ A}.$$

In another embodiment of the computing unit 114, the total current limit and/or the individual current limit is changed when predefined temperature thresholds are exceeded.

If the acquired temperature is below a first threshold of 80° C., it is in a non-critical range, so that the circuit breaker system may be operated at maximum current. To keep the temperature in the non-critical range, the circuit breaker system may be located in an air-conditioned environment, such as a cooled distribution cabinet.

If the first threshold value is exceeded, the temperature is in a critical range. As a countermeasure, individual output terminals or circuit breaker modules are switched off one after the other at regular time intervals until the temperature falls below the first threshold again, with the output terminals or circuit breaker modules being switched off according to a ranking. The (preferably predetermined) ranking may ensure, for example, that important loads remain in operation even at high temperatures.

If the acquired temperature further exceeds a second temperature threshold of 125° C., it is in an impermissible range. No further self-heating may take place, i.e. all overheated output terminals or circuit breaker modules are switched off or not restarted. This scenario may correspond to a faulty environment, for example in case of overload or too high power output to the loads.

Figure 3:
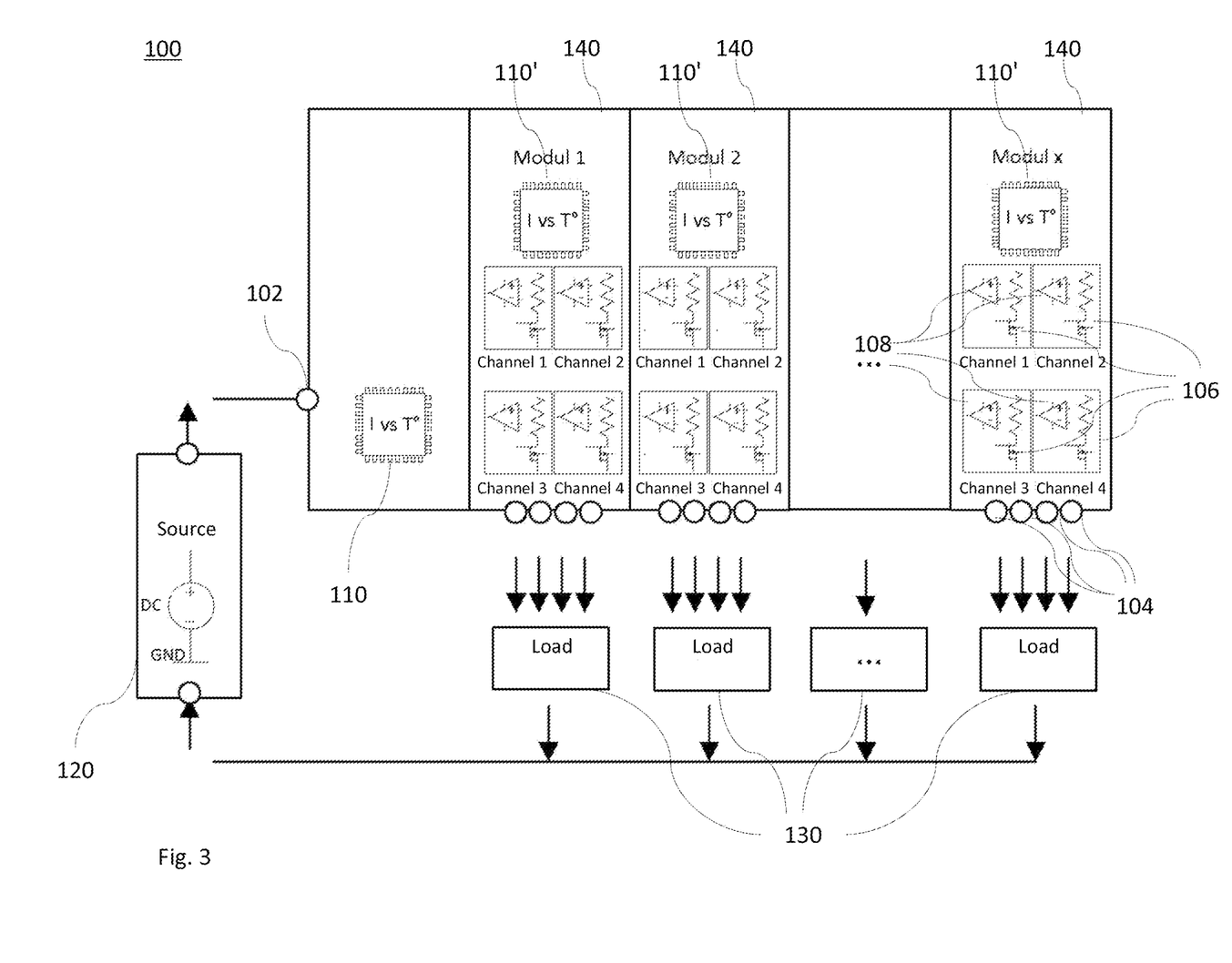
FIG. 3 a schematic representation of an electrical circuit breaker system according to a second embodiment.

FIG. 3 shows a schematic diagram of an electrical circuit breaker system according to a second embodiment.

Compared to the first embodiment, each of the circuit breaker modules 140 have a plurality of output terminals 104, in this case exactly four output terminals 104 each, and an additional module control unit 110'.

The module control unit 110' has the same schematic or functional structure as the control unit 110, preferably as shown in FIG. 2. Accordingly, the module control unit 110' includes a module current acquiring unit 112', a module temperature acquiring unit 116' and a module computing unit 114'. Alternatively, each of the module current acquiring unit 112', module temperature acquiring unit 116' and module computing unit 114', alone or in any possible combination with each other, may also be formed as an independent unit.

In each circuit breaker module 140, the respective module current acquiring unit 112' acquires the measured individual current magnitudes at the respective output terminals of the circuit breaker module 140 and also determines a total current magnitude equal to the sum of the individual current magnitudes within the circuit breaker module 140.

Furthermore, each of the module temperature acquiring units 116' acquires a temperature, which in this embodiment corresponds to the internal temperature of the corresponding module control unit 110'. Depending on the acquired temperature, the respective module computing unit 114' determines a module total current limit.

When it is determined in one of the circuit breaker modules 140 that the module total current magnitude exceeds the module total current limit, the corresponding to module control unit 110' selects one of the plurality of output terminals 104 of the corresponding circuit breaker module based on a ranking and interrupts the current supply at the selected output terminal 104 using the corresponding electrical switch 106.

As in the first embodiment, in the second embodiment, the control unit 110 monitors whether the total current magnitude exceeds the total current limit, wherein the temperature acquiring unit 116 acquires the temperature and the computing unit 114 determines the total current limit based on the acquired temperature. If the total current limit is exceeded, the control unit 110 selects one of the plurality of circuit breaker modules 140 based on a ranking of the circuit breaker modules 140 and instructs the module control unit 110' of the selected circuit breaker module 140 to interrupt the current supply to all output terminals of the selected circuit breaker module 140 by means of the corresponding electrical switches 106.

Figure 4:
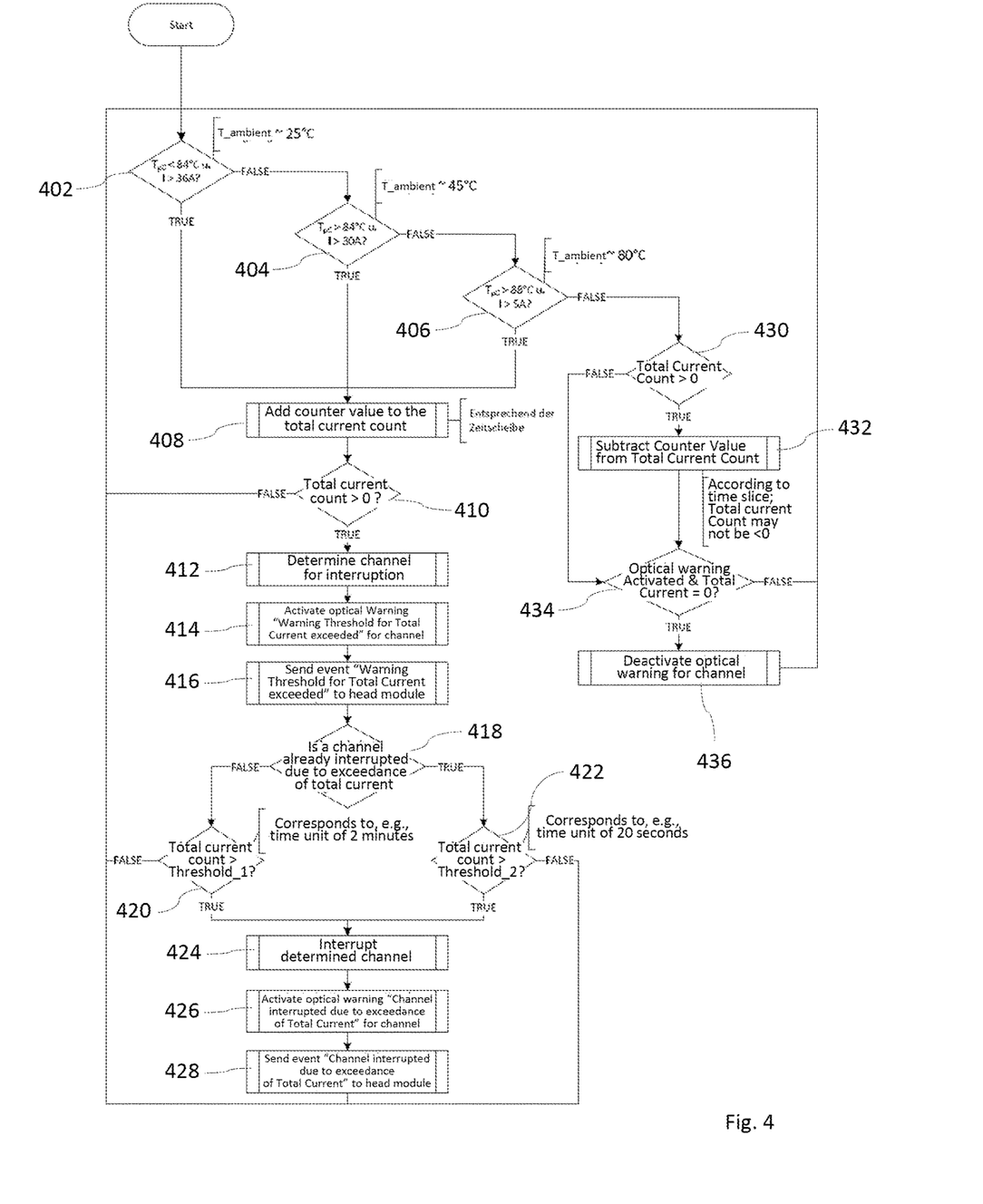
FIG. 4 a flow diagram of an exemplary method for temperature-dependent total current monitoring or sequence of temperature-dependent total current monitoring, which may be executable in the first and/or second embodiment.

FIG. 4 shows a flow diagram of an exemplary method (i.e., sequence) of temperature-dependent total current monitoring according to the first and/or second embodiment.

In the case of the first embodiment, all steps in FIG. 4 are carried out by the control unit in the control module, also known as the head module, whereas in the second embodiment they are carried out by the respective control units in the individual circuit breaker modules. The acquired temperature $T_{\mu C}$ (i.e., T_μC or T_micro-controller) corresponds here to the internal temperature of the control unit 110 or module control unit 110', which may be implemented in each case by a microcontroller (symbolically abbreviated as "μC").

In step 402, the first step is to verify that the acquired temperature is less than 84° C. and that the acquired current (i.e., acquired current magnitude) is greater than 36 A. An acquired temperature of 84° C. and an acquired current (i.e. acquired current magnitude) of 36 A corresponds to an ambient temperature of about 25° C.

If this condition is not met, step 404 checks whether the acquired temperature is greater than 84° C. and the acquired current is greater than 30 A. An acquired temperature of 84° C. and an acquired current of 30 A corresponds to an ambient temperature of about 45° C.

If this condition is not met either, the next step 406 checks whether the acquired temperature is less than 88° C. and the acquired current is greater than 5 A. An acquired temperature of 88° C. and an acquired current of 5 A corresponds to an ambient temperature of about 80° C.

If any of the conditions in steps 402, 404, or 406 are met, the counter value corresponding to a time slice is added to the total current counter (step 408), wherein the counter value is typically 1. If the total current counter is greater than 0 (step 410), an output terminal, also called a channel, is determined based on the ranking for disconnection (step 412). If the total current counter is not greater than 0, monitoring starts again at step 402. In step 414, the circuit breaker system then activates a visual warning, for example with the message "Total current warning threshold exceeded", for the determined channel.

In the second embodiment, the message "Warning threshold total current exceeded" is sent to the head module in the next step 416; in the first embodiment, this step is skipped, i.e. step 414 is followed directly by step 418. According to this step 418, it is checked whether there is already a switched-off channel (i.e., an interrupted output terminal) due to a total current exceeded. If this is not the case, it is checked whether the total current counter is greater than a threshold value 1 (step 420). If there is already a switched-off channel according to step 418, it is checked whether the total current counter is greater than a threshold value 2 (step 422). If the condition after step 420 or step 422 is not fulfilled, the monitoring starts again at step 402. If the condition after step 420 or step 422 is fulfilled, the determined channel is switched off (step 424) and a visual warning with the message "Channel switched off due to total current exceeded" is activated for the channel (step 426). In the second embodiment, in another step 428, the message "channel switched off due to total current exceeded" is sent to the head module. Subsequently, the monitoring is repeated starting with step 402.

If none of the three conditions according to steps 402, 404 and 406 are fulfilled, then it is checked whether the total current counter is greater than 0 and, if necessary or appropriate, the counter value is subtracted from the total current counter, whereby the total current counter must not be less than 0 (step 432). The counter value is usually equal to 1. If the condition in step 432 is not met, then monitoring starts again at step 402. If the condition in step 432 is met, then a check is made to see if a visual warning is activated and the total counter is equal to 0 (step 434). If this is the case, then this active optical warning is deactivated (step 436). Subsequently, the monitoring is repeated starting with step 402.

Figure 5:
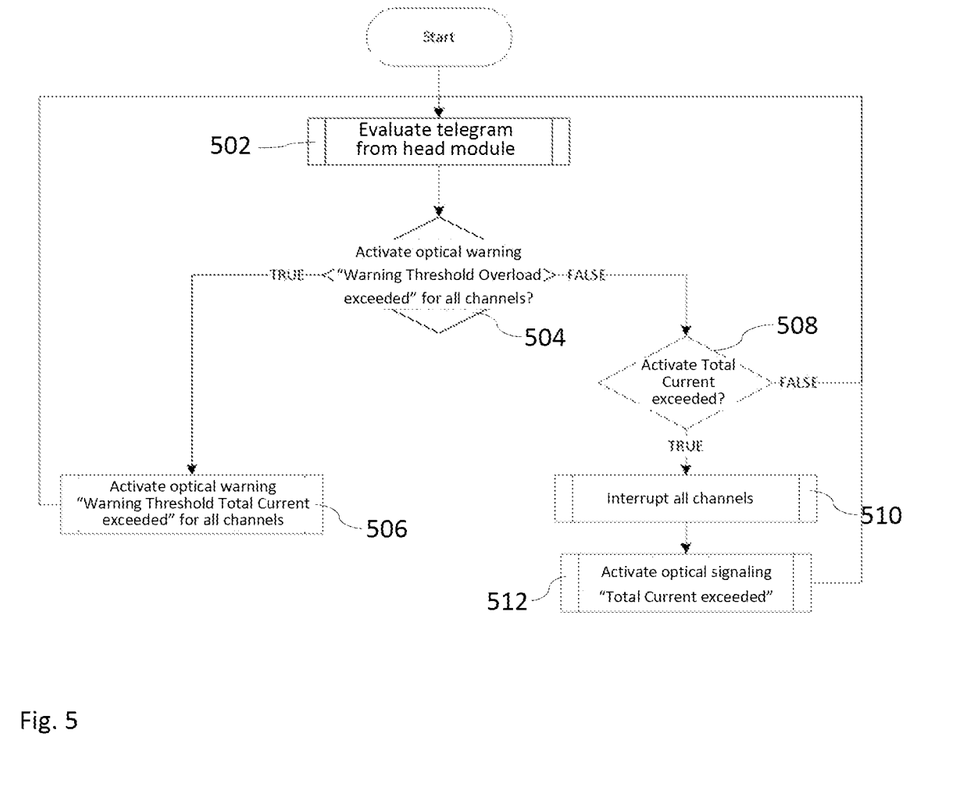
FIG. 5 a flow diagram of an exemplary method for temperature-dependent total current monitoring or a sequence of temperature-dependent total current monitoring, which cannot be carried out in the second embodiment if an entire circuit breaker module is to be disconnected.

FIG. 5 shows a flow diagram of the sequence of temperature-dependent total current monitoring according to the second embodiment, when an entire circuit breaker module is to be disconnected.

If the control unit 110 of the control module 150, also called the head module, determines that the total current magnitude exceeds the total current limit, the control unit 110 selects one of the plurality of circuit breaker modules 140 based on a ranking of the circuit breaker modules 140 and sends a control signal (signal for short), for example in the form of a telegram, to the module control unit 110' of the selected circuit breaker module 140. This module control unit 110' evaluates the message from the control unit 110 in step 502, and determines whether the optical warning "Warning threshold overload reached" is to be activated (for example, displayed) for all channels, i.e., all output terminals, in step 504. If this is the case, the optical warning "Warning threshold overload reached" is activated for all channels in step 506, and monitoring starts again at step 502.

If the optical warnings are not to be activated after step 504, it is determined whether the "total current exceeded" control instruction is to be activated (i.e., executed) in step 508. If not, monitoring starts again at step 502. If the condition in step 508 is met, all channels are switched off (i.e., all output terminals are interrupted), i.e. the current supply to all output terminals of the selected circuit breaker module 140 are interrupted by means of the corresponding electrical switches 106 in step 510. Subsequently, the optical warning, also called optical signaling, "total current exceeded" is activated (i.e., output) in step 512 and monitoring starts again at step 502.

Although the disclosure has been described in terms of exemplary embodiments, it will be apparent to those skilled in the art that various modifications may be made and equivalents may be used as substitutes. Further, many modifications may be made to suit a particular situation, a particular type of current (for example, alternating current or three-phase current), or a particular application to the teachings of the disclosure. Consequently, the disclosure is not limited to the disclosed embodiments, but includes all embodiments falling within the scope of the appended claims.

LIST OF REFERENCE NUMERALS

Electrical circuit breaker system 100
Input terminal 102
Output terminal 104
Electrical switch 106
Current measuring unit 108
Control unit 110
Current acquiring unit or monitoring unit 112
to Computing unit 114
Temperature acquiring unit 116
Module control unit 110'
Module current acquiring unit or module monitoring unit 112'
Module computing unit 114'
Module temperature acquiring unit 116'
Electrical current source 120
Electrical load 130
Circuit breaker module 140
Control module 150

The invention claimed is:

1. An electrical circuit breaker system comprising:
an input terminal for connecting an electrical current source;

a plurality of output terminals each for connecting electrical loads, each output terminal having an electrical switch for interrupting a current supply, and a current measuring unit for measuring an individual current magnitude;

a current acquiring unit for acquiring the individual current magnitudes measured at the plurality of output terminals and for determining a total current magnitude corresponding to a sum of the individual current magnitudes;

a temperature acquiring unit for acquiring a temperature;

a computing unit configured to determine a total current limit as a function of the acquired temperature; and a control unit configured to select one of the plurality of output terminals based on a ranking of the output terminals and to interrupt the current supply at the selected output terminal by means of the corresponding electrical switch when the total current magnitude exceeds the determined total current limit.

2. The electrical circuit breaker system of claim 1, wherein the computing unit is further configured to determine an individual current magnitude as a function of the acquired temperature, and wherein the control unit is further configured to interrupt the current supply at one of the plurality of output terminals by means of the corresponding electrical switch when the individual current magnitude at that output terminal exceeds the individual current magnitude.

3. The electrical circuit breaker system of claim 2, wherein an individual current limit is determined for each of the output terminals, wherein the temperature on which the individual current limit depends corresponds to a temperature at the respective output terminal.

4. The electrical circuit breaker system of claim 1, wherein the electrical switch is a semiconductor switch.

5. The electrical circuit breaker system of claim 4, wherein the semiconductor switch is a metal-oxide semiconductor field effect transistor.

6. The electrical circuit breaker system of claim 1, wherein the control unit is further configured to perform a check at periodic time intervals to determine whether the total current limit or the individual current limit has been exceeded.

7. The electrical circuit breaker system of claim 6, wherein the control unit is further configured to interrupt the current supply from one of the plurality of output terminals when the total current limit or the individual current limit is exceeded for a number of consecutive checks, the number corresponding to a predetermined threshold.

8. The electrical circuit breaker system of claim 7, wherein the predetermined threshold is a first threshold if, based on the checks, the current supply of any of the plurality of output terminals is not interrupted, and wherein the predetermined threshold is a second threshold it, based on exceeding the total current limit or the individual current limit, the current supply of any of the plurality of output terminals is already interrupted, wherein the first threshold is greater than the second threshold.

9. The electrical circuit breaker system of claim 6, wherein the control unit is further configured to interrupt the current supply from one of the plurality of output terminals when the number of exceedances of the total current limit and/or the individual current limit minus the number of non-exceedances in past checks exceeds a predetermined threshold.

10. The electrical circuit breaker system of claim 6, wherein the control unit is further configured to increase an exceedance value by the value of 1 for each exceedance of the total current limit or the individual current limit and decrease the exceedance value by the value of 1 for each non-exceedance of the total current limit or the individual current limit, the exceedance value being greater than or equal to 0, and to interrupt the current supply from one of the plurality of output terminals when the exceedance value exceed a predetermined threshold value.

11. The electrical circuit breaker system of claim 1, wherein the electrical circuit breaker is modular, and comprises:

at least two circuit breaker modules, each including at least one of the plurality of output terminals, and a control module including the current acquiring unit, the computing unit, and the control unit.

12. The electrical circuit breaker system of claim 11, wherein each of the circuit breaker modules comprises:

at least one of the plurality of output terminals;

a module current acquiring unit for acquiring individual current magnitudes measured at the respective at least one output terminal, or for determining a module total current magnitude corresponding to the sum of the individual current magnitudes of the respective circuit breaker module; and a module control unit configured to select, in accordance with the control unit, the one of or the plurality of output terminals of the respective circuit breaker module and to interrupt the current supply at the selected output terminal by means of the corresponding electrical switch when the total current magnitude exceeds the determined total current limit or the total module current magnitude exceeds the determined total module current limit.

13. The electrical circuit breaker system of claim 12, wherein each of the circuit breaker modules includes at least two of the plurality of output terminals.

14. The electrical circuit breaker system of claim 12, wherein each of the circuit breaker modules further comprises:

a module temperature acquiring unit for acquiring a temperature of the respective circuit breaker module and a module computing unit configured to determine a module total current limit as a function of the acquired module temperature.

15. The electrical circuit breaker system of claim 12, wherein the module control unit selects the one of or the plurality of output terminals of the respective circuit breaker module based on the one or the ranking of the output terminals of the respective circuit breaker module.

16. The electrical circuit breaker system of claim 11, wherein the temperature is an ambient temperature measured in the control module.

17. The electrical circuit breaker system of claim 1, wherein the ranking of the output terminals corresponds to
   (a) a predetermined prioritization of the plurality of output terminals,
   (b) a decreasing order of the acquired individual current magnitudes of the output terminals, or
   (c) a decreasing order of the distances of the output terminals between the control unit or the input terminal and the respective output terminal.

18. The electrical circuit breaker system of claim 1, wherein the temperature corresponds to
   (a) a temperature of the control unit,
   (b) an ambient temperature of the electrical circuit breaker system, (c) an average of the individual temperatures at each of the output terminals, or
(d) a maximum of the individual temperatures at each of the output terminals.

19. The electrical circuit breaker system of claim 1, wherein the control unit is further configured to output a warning signal if the total current limit or the individual current limit is exceeded.

20. The electrical circuit breaker system of claim 1, wherein the warning signal is an optical signal.

* * * * *